(12) United States Patent
Wheatley

(10) Patent No.: US 6,588,825 B1
(45) Date of Patent: Jul. 8, 2003

(54) RAIN DIVERTING DEVICE FOR A TONNEAU COVER SYSTEM

(76) Inventor: Donald G. Wheatley, 4451 Ford Rd., Ann Arbor, MI (US) 48105

( * ) Notice: Subject to any disclaimer, the term of this patent is extended or adjusted under 35 U.S.C. 154(b) by 0 days.

(21) Appl. No.: 10/133,138

(22) Filed: Apr. 26, 2002

(51) Int. Cl.$^7$ .................................................. B60P 7/02
(52) U.S. Cl. ........................... 296/100.01; 296/100.09; 296/100.18; 296/100.16
(58) Field of Search ....................... 296/100.01, 100.18, 296/100.07, 100.06, 100.17, 100.09, 100.16, 100.1, 100.15, 100.02, 37.6, 39.2; 224/404

(56) References Cited

U.S. PATENT DOCUMENTS

| | | | |
|---|---|---|---|
| 4,313,636 A | * 2/1982 | Deeds | 296/100.09 |
| 4,479,677 A | 10/1984 | Gulette et al. | |
| 4,838,602 A | 6/1989 | Nett | |
| 4,861,092 A | * 8/1989 | Bogard | 296/100.09 |
| 5,121,959 A | 6/1992 | King | |
| 5,121,960 A | 6/1992 | Wheatley | |
| 5,154,478 A | * 10/1992 | Erickson et al. | 296/39.2 |
| D333,607 S | 3/1993 | Isler | |
| 5,207,262 A | 5/1993 | Rushford | |
| 5,522,635 A | * 6/1996 | Downey | 296/100.16 |
| 5,564,773 A | 10/1996 | Lapsley et al. | |
| 5,584,521 A | * 12/1996 | Hathaway et al. | 296/100.16 |
| 5,636,893 A | 6/1997 | Wheatley et al. | |
| 5,882,058 A | * 3/1999 | Karrer | 296/100.01 |
| 5,961,173 A | * 10/1999 | Repetti | 296/100.01 |
| 6,000,740 A | * 12/1999 | Hall et al. | 296/37.6 |
| 6,024,402 A | * 2/2000 | Wheatley | 296/100.18 |
| 6,053,558 A | * 4/2000 | Weldy et al. | 296/100.18 |
| 6,076,881 A | * 6/2000 | Tucker | 296/100.18 |
| 6,092,852 A | * 7/2000 | Lawrence | 296/37.6 |
| D434,361 S | * 11/2000 | Block et al. | D12/401 |
| 6,149,220 A | * 11/2000 | Weldy et al. | 296/100.06 |
| 6,203,086 B1 | * 3/2001 | Dirks et al. | 296/100.07 |
| 6,217,103 B1 | * 4/2001 | Schultz et al. | 296/100.09 |
| 6,221,290 B1 | * 4/2001 | Waddington et al. | 264/45.3 |
| 6,234,559 B1 | * 5/2001 | Block et al. | 296/100.06 |
| D444,763 S | 7/2001 | Draine | |
| 6,276,735 B1 | * 8/2001 | Champion | 296/100.09 |
| 6,290,441 B1 | * 9/2001 | Rusu | 296/100.07 |
| 6,338,520 B2 | * 1/2002 | Rusu et al. | 296/100.01 |
| 6,340,194 B1 | * 1/2002 | Muirhead et al. | 296/100.01 |
| 6,382,698 B1 | 5/2002 | Harrell | |
| 6,386,616 B1 | * 5/2002 | Wheatley | 296/100.16 |
| 2001/0042987 A1 | * 11/2001 | Getzschman et al. | 296/37.6 |
| 2002/0096901 A1 | * 7/2002 | Iafrate et al. | 296/37.6 |
| 2002/0130527 A1 | * 9/2002 | Henderson | 296/100.06 |

* cited by examiner

*Primary Examiner*—Kiran Patel
(74) *Attorney, Agent, or Firm*—Harness, Dickey & Pierce, P.L.C.

(57) ABSTRACT

A diverter for diverting rain water and inhibiting it from leaking into a cargo box of an automotive vehicles, such as a pick-up truck. The diverter is positioned below a front rail of a tonneau cover frame and includes a horizontal portion extending along the length of the front rail of the tonneau cover frame. A plurality of ribs in a top of the horizontal portion define channels for diverting rain water. The diverter includes a vertical portion coupled to the horizontal portion and adapted to be positioned adjacent to a storage container. Preferably, a width of the horizontal portion is such to accommodate a range of different sized storage containers.

20 Claims, 2 Drawing Sheets

RAIN DIVERTING DEVICE FOR A TONNEAU COVER SYSTEM

BACKGROUND OF THE INVENTION

1. Field of the Invention

This invention relates generally to systems for enclosing vehicle cargo areas, and in particular to rain diverting devices for use with tonneau covers.

2. Discussion

Tonneau covers are frequently used to cover the cargo area of a vehicle such as the cargo box of a pick-up truck. A typical tonneau cover includes a sheet of fabric or other flexible, and preferably waterproof material, and a frame which extends along the perimeter of the top of the cargo box. The material is attached to the frame, and can be removed to allow access to the cargo area by snaps as is conventional. The frame includes a set of rails attached to the top of the side walls and front and back walls of the cargo box by conventional clamps, bolts, adhesives, or other fastening means. The rails are joined together by corner members. Generally, a movable tailgate is located at the rear wall of the cargo box and the rail is attached to the side walls but it is not joined to the rear wall.

Often a storage container is mounted in the front of the cargo box of the truck so as to extend across the width of the cargo box. The container provides an enclosed area for tools and other smaller objects. Tonneau cover systems have been adapted to cover the portion of the cargo box not used by the storage container. However, in these known cover systems, the front rail of the tonneau cover frame extends across the cargo box and does not rest on the top of the front wall of the cargo box. The front rail of the frame rests flush with the rear edge of the storage container. Generally, it is difficult to fasten the front rail of the frame tightly against the storage container to form a water tight seal, thus, rainwater may seep into the cargo box.

One proposed solution to this problem has been to use an angled bracket between the storage container and the front rail of the frame, such that the front rail overlaps the horizontal portion of the bracket. However, water can still seep into the gap between the bracket and the rail and thus rainwater can collect in the interior of the cargo box.

Another proposed solution to this problem is to mount the tonneau cover system directly to the toolbox, thus sealing the gap between the two. This, however, requires a unique sized frame and sheet for each toolbox in order to match the perimeter of the portion of the cargo area not used by storage area, since the size of storage containers is not standard. Furthermore, it is difficult to seal cover materials such as flexible vinyl to a rigid structure such as a storage container.

Therefore, there is a need to provide a device for preventing rain water from seeping into the cargo area of a vehicle when a tonneau cover system is used and which can accommodate storage containers of varying sizes.

SUMMARY OF THE INVENTION

The present invention provides a tonneau cover systems adapted to prevent rain water from leaking into the cargo box of an automotive vehicle. The cargo box includes a storage container attached to the cargo box, a frame mounted on the top of the cargo box and a cover. The system includes a diverter member which may be attached to or immediately adjacent to the storage container. The diverter member has a vertical portion and a horizontal portion. The vertical portion is between the storage container and the frame. The horizontal portion is between the top of the cargo box and the frame. The horizontal portion prevents rain water from entering into the cargo box.

It is an object of the present invention to provide an apparatus for preventing water from seeping into the cargo area of a vehicle when a tonneau cover system is used in conjunction with a storage container.

It is another object of the present invention to provide an apparatus for diverting water for use with a tonneau cover and storage containers of various sizes.

These and other objects and features of the present invention will become apparent from the description and especially taken in conjunction with the accompanying drawings illustrating the invention and the preferred embodiment.

BRIEF DESCRIPTION OF THE DRAWINGS

The various advantages of the present invention will become apparent to one skilled in the art by reading the following specification and subjoined claims and by referencing the following drawings in which:

DETAILED DESCRIPTION OF THE PREFERRED EMBODIMENTS

Figure 1:
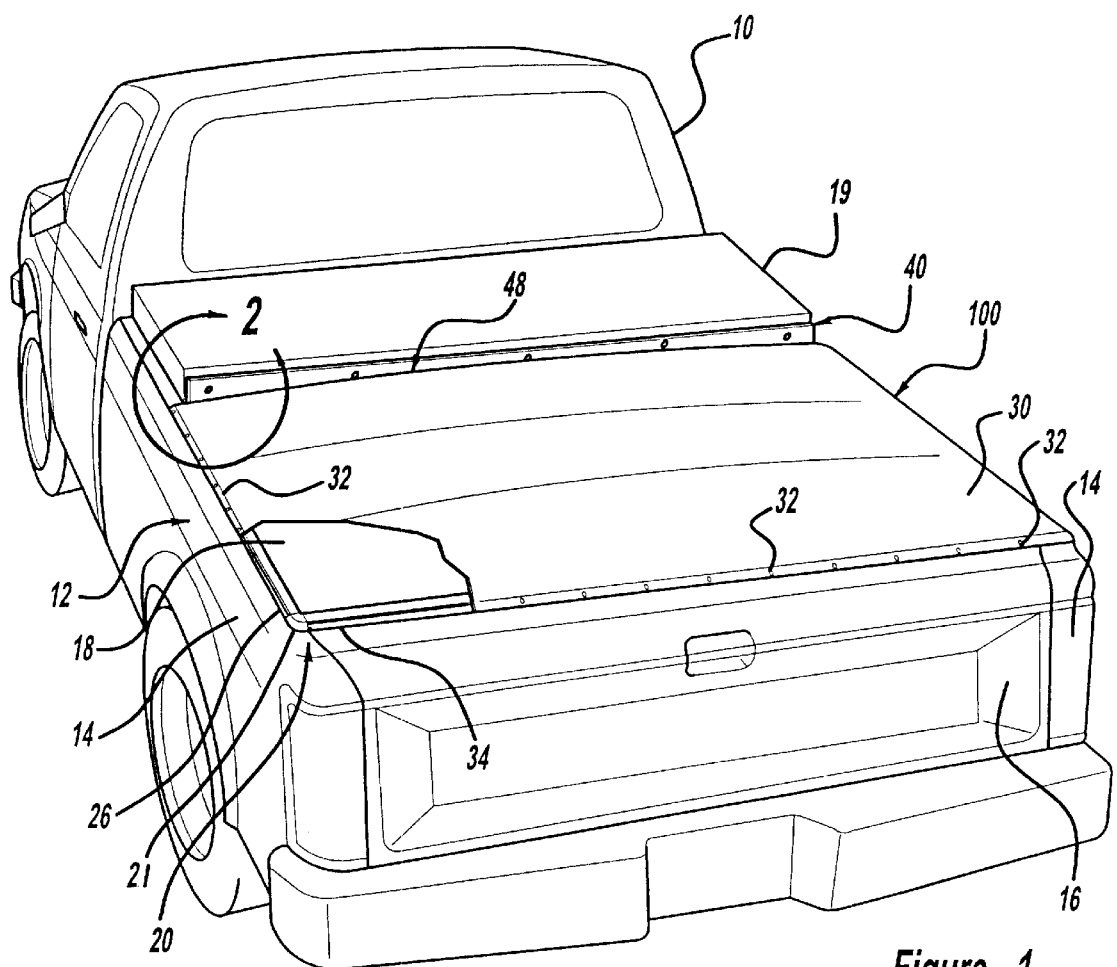
FIG. 1 is a perspective view of the rear of a pick-up truck, showing a rain diverter used in conjunction with a storage container and a tonneau cover system in accordance with a preferred embodiment of the present invention. A section of the tonneau cover material is cut away to show a tonneau cover frame.

Referring to FIG. 1, there is shown a conventional pick-up truck 10 including a cargo box 12 defined by side walls 14, a front wall (not shown), a movable tailgate 16 and a floor or bed 18. A storage container 19 is mounted within the cargo box 12 adjacent to the front wall of the cargo box 12 and the top of the side walls 14 as is common in the art. The storage container 19 is generally used to store tools and other small objects.

Figure 3:
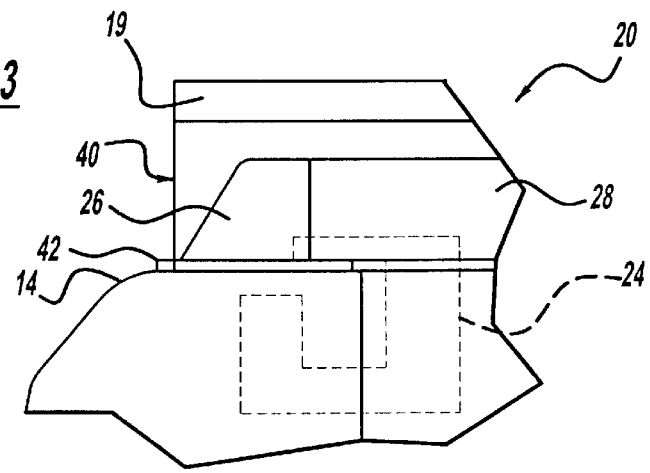
FIG. 3 is a partial side view of the rain diverter and tonneau cover system viewed from the rear of the cargo box.
Figure 2:
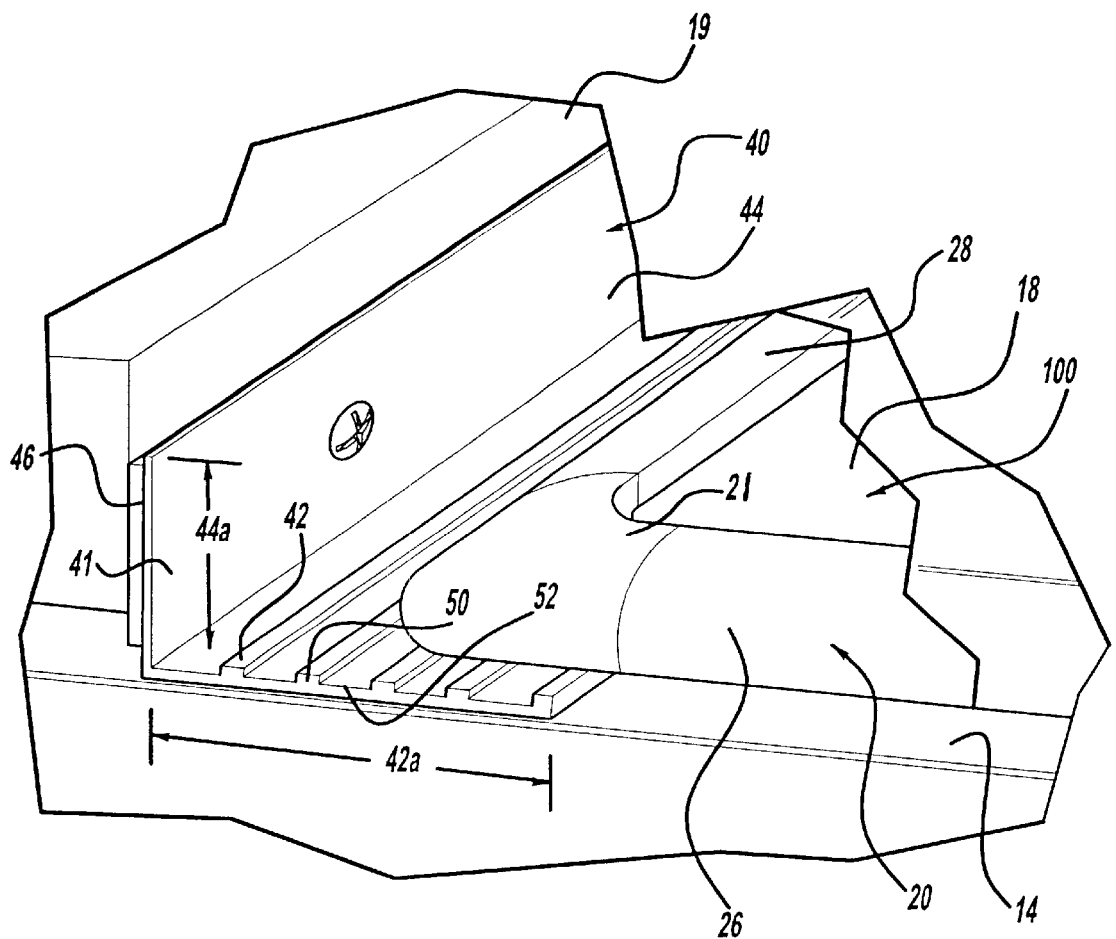
FIG. 2 is a detailed view of the section in FIG. 1 denoted by the circle 2, showing a close up view of the rain diverter and the tonneau cover frame.

As shown in FIGS. 1–3, the tonneau cover system according to the present invention is identified by the numeral 100. The tonneau cover system 100 includes a frame 20, a cover or sheet 30 and a diverter member 40. The frame 20 includes side rails 26 attached to the tops of the side walls 14 and a front rail 28 attached to the side rails 26 through the use of corner members 21 connected by conventional means such as fasteners or soldering. The side rails 26 are attached to the tops of the side walls 14 using conventional means or clamps 24 which fit in cut-outs (not shown) in the side rails 26. One skilled in the art will recognize that other clamping means, such as adhesives or bolts, are within the scope of the present invention. The tonneau cover frame 20 has a rear rail 34 which is not connected to the top of the tailgate 16.

A sheet 30 of fabric or other flexible, and preferably waterproof material, is removably attached to the frame 20 by snaps 32 or other means as is conventional. The sheet 30 encloses the cargo box 12 and prevents rainwater from entering into the cargo box 12. The storage container 19, such as a toolbox, can be used in conjunction with the tonneau cover system 100. Typically, the storage container 19 is attached to the side walls 14 of the cargo box 12. The front rail 28 of the tonneau cover frame 20 rests adjacent to the rear edge of the storage container 19 so as to enclose the portion of the cargo box 12 not occupied by the storage container 19.

The rain diverter member 40 is placed between the storage container 19 and the front rail 28 of the tonneau cover frame 20. The rain diverter 40 has a preferably generally L-shaped cross section. Those skilled in the art will recognize that the diverter 40 may be made of two members that are fastened together or made as a single member formed by extrusion or other method. The front rail 28 of the tonneau cover frame 20 rests on the top surface of a horizontal portion 42 of the diverter 40. The diverter 40 extends along the width of the cargo box 12 and rests on the tops of the side walls 14 of the cargo box 12. The diverter 40 is retained on top of the side walls 14 of the cargo box 12 by clamps 24 coupled through the side rails 26 and the corner members 21. Clamps 24 may be "C" clamps or similar devices well known in the art. The diverter 40 also includes a vertical portion 44 which is coupled to the horizontal portion 42. The vertical portion 44 rests against the rear surface of the storage container 19. The vertical portion 44 of the diverter 40 may be attached to the storage container 19 with conventional fasteners such as screws or bolts. Optionally, a layer of rubber or other resilient member 46 may be placed between the vertical portion 44 of the diverter 40 and the storage container 19.

As best shown in FIG. 2, the horizontal portion 42 of the diverter 40 includes at least one and preferably a plurality of ribs 50 which define channels 52 for diverting rainwater. The ribs 50 and channels 52 extend generally parallel along the entire length of the horizontal portion 42. Those skilled in the art will recognize that other channel configurations other than the illustrated rectangles, are within the scope of the present invention. The horizontal portion 42 of the diverter 40 generally extends to a point along the tops of the sides walls 14 of the cargo box 12 which ensures that any rainwater that collects in the channels 52 runs along the channels 52 and is directed or diverted to flow over the side walls 14 of the cargo box 12. Thus, the diverter 40, with its ribs 50 and channels 52, prevents water from flowing off of the cover 30 between the storage container 19 and the front rail 28 of the tonneau cover frame 20 and into the cargo box 12.

Preferably, as shown in FIG. 2, the width of the horizontal portion 42 of the diverter 40, represented by a dimension 42a, is greater than the height of the vertical portion 44 of the diverter 40, represented by a dimension 44a. The width of the horizontal portion 42a accommodates storage containers 19 of various sizes while maintaining a tonneau cover frame 20 with side rails 26 of constant length. Thus, if a storage container 19 of shorter width (measured from the front of the cargo box 12 rearward) is used, the front rail 28 of the tonneau cover frame 20 does not extend as far over the width of the horizontal portion 42 of the diverter 40 as it would in the case where a storage container 19 of greater width is used. In the later case, the cargo box 12 would still be enclosed and rainwater would still be diverted from seeping into the cargo box 12. The width of the horizontal portion 42a of the diverter 40 is preferably greater than three times the height of the vertical portion 44a of the diverter 40 but this should not be taken as a limitation of the invention since a width of the horizontal portion 42a that is between 1.0 to 10.0 times a height of the vertical portion 44a is also within the scope of the invention. Optionally, the horizontal portion 42 of the diverter 40 does not include ribs or channels, but rather other means for laterally directing water commonly known in the industry.

In operation, the tonneau cover system 100 is used in conjunction with the storage container 19 to prevent rainwater from seeping into the cargo box 12. The cover 30 prevents rainwater from entering a majority of the cargo box 12. The rainwater that flows forward off of the cover 30 is collected by the diverter 40 and channeled to and over the side walls 14 of the cargo box 12, so as not to enter into the cargo box 12. As described earlier, the tonneau cover system 100 may be adapted to accommodate various combinations of storage container and tonneau cover system sizes.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

I claim:

1. In a tonneau cover system adapted to prevent water from leaking into a cargo box having a pair of side walls of a motor vehicle, the system having a storage container attached to the cargo box, a frame mounted on a top surface of the cargo box, and a cover attached to the frame, said tonneau cover system comprising:

a diverter member attached to the storage container, said diverter member having a vertical portion and a horizontal portion, said horizontal portion including portions defining a channel oriented to divert water over the side walls of the cargo box.

2. In a tonneau cover system of claim 1, wherein said horizontal portion has a width and said vertical portion has a height, said width being greater than said height.

3. In a tonneau cover system of claim 2, wherein said width of said horizontal portion is between 1.0 to 10 times said height of said vertical portion.

4. In a tonneau cover system of claim 1, said horizontal portion including a plurality of channels.

5. In a tonneau cover system of claim 1, said horizontal portion having a plurality of ribs extending generally along the length thereof, said ribs defining a plurality of channels.

6. In a tonneau cover system of claim 5, said ribs extending upward from said horizontal member.

7. In a tonneau cover system of claim 1, said diverter member being formed from an extrusion.

8. A tonneau cover system for an automotive vehicle having a cargo box and a storage container located inside of the cargo box, said cargo box being defined in part by a pair of side walls, said system comprising:

a frame including a front rail coupled to two side rails, each of said side rails adapted for mounting to a top surface of the side walls of the cargo box;

a cover mounted to said frame; and a diverter member adapted to extend laterally across the cargo box, said diverter member having a horizontal portion and at least two ribs on a top surface of said horizontal portion, said ribs cooperating to define at least one channel to divert water so as to flow over the side walls of the cargo box.

9. A tonneau cover system of claim 8 further comprising: a clamp member retaining said frame to the cargo box.

10. A tonneau cover system of claim 8, wherein said diverter member has a length adapted to divert water over the side walls of the cargo box.

11. A tonneau cover system of claim 8, wherein said diverter member further includes a vertical portion, said vertical portion having fastener means for fastening said vertical portion to the storage container.

12. A tonneau cover system of claim 11 further comprising:
   a resilient member in contact with said vertical portion and adapted to be located between the storage container and said vertical portion.

13. A tonneau cover system of claim 8, wherein said diverter member further comprises a vertical portion cooperating with said horizontal portion to define a generally L-shaped cross-sectional shape, wherein said vertical portion has a height and said horizontal portion has a width, said height of said vertical portion being less than said width of said horizontal portion.

14. A tonneau cover system of claim 13, wherein said width of said horizontal portion is between 1.0 to 10 times said height of said vertical portion.

15. A rain diverter adapted for use with a cargo box of an automotive vehicle, a storage container within the cargo box, and a tonneau cover assembly mounted over the cargo box, said rain diverter comprising:
   a horizontal portion having a width and a length and including portions defining a channel extending said length of said horizontal portion, and a vertical portion having a height, said height of said vertical portion being less than said width of said horizontal portion.

16. The rain diverter of claim 15, wherein said height of said vertical portion is less than one third said width of said horizontal portion.

17. The rain diverter of claim 15, wherein said width of said horizontal portion is between 1.0 to 10 times said height of said vertical portion.

18. The rain diverter of claim 15, wherein said portions of said horizontal portion define a plurality of channels.

19. The rain diverter of claim 15, wherein said vertical portion is adapted to be coupled to the storage container.

20. The rain diverter of claim 15, wherein said horizontal portion is adapted to be coupled to a frame member of the tonneau cover assembly.

* * * * *